United States Patent [19]

Machi et al.

[11] 4,287,272
[45] Sep. 1, 1981

[54] CELL SEPARATOR AND CELL

[75] Inventors: Sueo Machi, Takasaki; Isao Ishigaki, Maebashi; Takanobu Sugo, Gunma; Toshio Okada, Kadoma; Kazuo Murata, Takatsuki; Shiro Tanso, Takatuski; Keizi Senoo, Takatsuki, all of Japan

[73] Assignees: Japan Atomic Energy Research Inst., Tokyo; Yuasa Battery Co. Ltd., Osaka, both of Japan

[21] Appl. No.: 142,621

[22] Filed: Apr. 21, 1980

[51] Int. Cl.³ .............................................. H01M 2/16
[52] U.S. Cl. .................................... 429/144; 429/254
[58] Field of Search ............... 429/144, 145, 152, 153, 429/154, 155, 142, 249, 253, 254

[56] References Cited
U.S. PATENT DOCUMENTS

| | | | |
|---|---|---|---|
| 1,386,650 | 8/1921 | Norris | 429/142 |
| 2,858,352 | 10/1958 | Solomon | 429/142 |
| 3,730,772 | 5/1973 | Stark | 429/254 |
| 4,201,641 | 5/1980 | Gotoda et al. | 429/254 |
| 4,206,275 | 6/1980 | Bernstein et al. | 429/254 |

*Primary Examiner*—Donald L. Walton
*Attorney, Agent, or Firm*—Browdy and Neimark

[57] ABSTRACT

There is disclosed a novel cell separator made of a grafted membrane comprising a polyethylene film which is graft-copolymerized with a monomer having an ion exchange group, characterized in that said membrane has an area which is not grafted at all or an area of low degree grafting. By making use of this membrane, a small size and thin cell having excellent performance as well as satisfactory mechanical strength can be produced at low cost with great advantages.

3 Claims, 9 Drawing Figures

CELL SEPARATOR AND CELL

BACKGROUND OF THE INVENTION

1. Field of the Invention

This invention relates to a cell separator, cell and a process for making a cell separator. More particularly, this invention relates to a dimensionally stable separator and an easy-to-assemble cell.

2. Description of the Prior Art

With the recent demand for batteries of higher capability and longer service life, a highly durable separator material, especially a grafted membrane which comprises a polyethylene film base to which a monomer having an ion exchange group is grafted is being studied as a material for cell separators. Such grafted membrane which comprises backbone chain of polyethylene having attached thereto grafted branch polymers consisting of a monomer having an ion exchange group absorbs an electrolyte to acquire ionic conductivity. The more the monomers that are grafted, the higher the ionic conductivity of the membrane. When the membrane contains an electrolyte, it swells and changes its dimensions in length, width, and thickness. Such dimensional change in the membrane accompanying swelling increases with an increase in the degree of grafting. An ordinary membrane having such an ionic conductivity (electrical resistance) that is usable as a cell separator undergoes a dimensional change of 15 to 20% in an electrolyte, and the value may even reach 25%. Such great dimensional change, especially that in longitudinal and transversal directions, makes the assembly of a cell of small size and volume very difficult. Some degree of dimensional change is permitted in a large-size cell, but after it is filled with an electrolyte, the separator held between electrodes swells to form unevenly distributed gaps between the electrodes where gas bubbles generated are confined, resulting in low cell performance. Conventionally, to eliminate such defects, a stretched grafted membrane is attached to another separator which is dimensionally stable (especially in longitudinal and transversal directions) against a cell electrolyte, such as a micro-porous film made of cellophane or synthetic resin. This technique prevents the membrane from swelling in an electrolyte, but since it must be used in combination with another separator, its good properties have not been fully reflected in the making of a cell of higher capability, especially a cell of increased volumetric efficiency.

SUMMARY OF THE INVENTION

This invention eliminates these defects of the conventional cell separator, and it provides a dimensionally stable separator as well as a small-size cell easy to assemble.

This invention will be apparent by reading the following description in conjunction with the accompanying drawings, in which.

Figure 2:
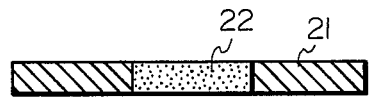
FIG. 2 is a cross section of a sheet of polymeric material to be used in another embodiment of this invention.
Figure 3:
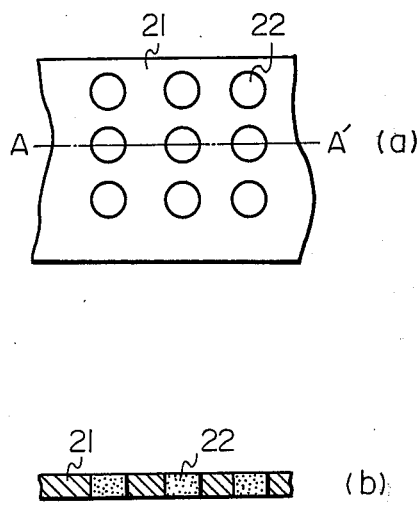
Figure 4:
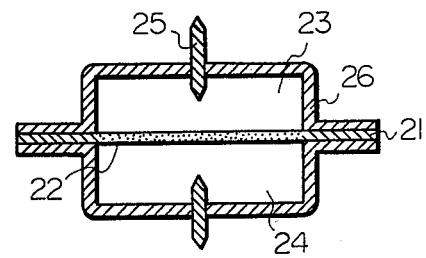
Figure 5:
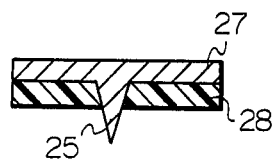
Figure 6:
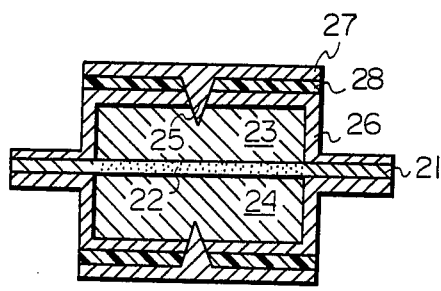
Figure 7:
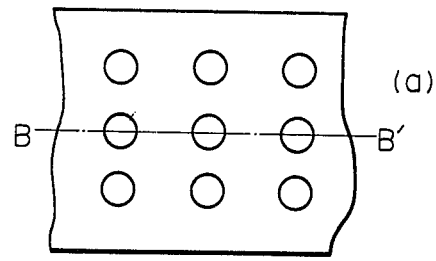
Figure 8:
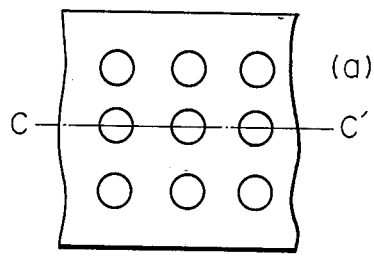
Figure 9:
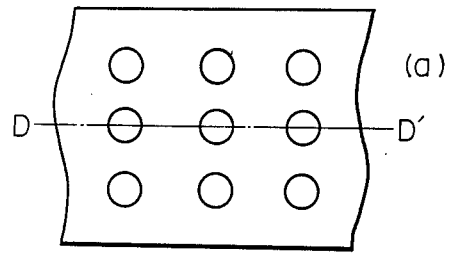
Figure 9:
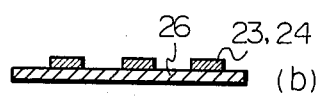
Figure 9:
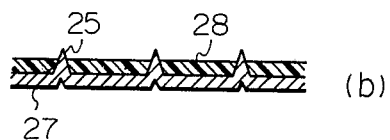

FIG. 3 includes a plan view (a) and a cross-sectional view (b) of a separator using a sheet identical with that shown in FIG. 2 except that it is partially provided with hydrophilic groups;

FIG. 4 is a cross section of a cell according to one embodiment of this invention;

FIG. 5 is a cross section of a collector terminal having a projection and which is lined with a layer of synthetic resin;

FIG. 6 is a cross section of a cell according to one embodiment of this invention;

FIG. 7 includes a plan view (a) and a cross-sectional view (b) showing a plurality of cells according to this invention;

FIG. 8 includes a plan view (a) and a cross-sectional view (b) showing a sheet comprising a cell protecting film integral with an active material; and FIG. 9 includes a plan view (a) and a cross-sectional view (b) showing a sheet provided with a plurality of collector terminals.

Figure 1:
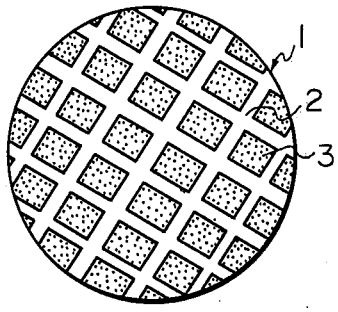
FIG. 1 is a partially enlarged perspective view of a cell separator according to one embodiment of this invention.

By reference to FIG. 1, a cell separator according to one embodiment of this invention comprises a grafted membrane in which a polyethylene film 1 serving as a backbone polymer is graft-polymerized with a monomer having an ion exchange group in such a manner that the membrane contains an area 2 which is not graft-polymerized at all or of low degree of grafting (this area will hereunder be referred to as a non-grafted area) which provides discrete areas of high degree of grafting 3. The grafted membrane containing such discrete areas of high degree of grafting can make a separator which undergoes a very small degree of dimensional change in an electrolyte because even if those areas of high degree of grafting swell, the surrounding non-grafted areas do not swell at all or swell only slightly. Since the areas of high degree of grafting are surrounded by non grafted areas, the membrane swells only in the areas of high degree of grafting and such swelling in no way affects the overall dimensions of the membrane when it is used as a separator. The electrical resistance of the resulting separator is lower than that of a grafted membrane wherein the base film is uniformly grafted throughout and the degree of grafting of which is reduced to provide the same degree of resistance to swelling. The electrical resistance of a grafted membrane is generally proportional to the degree of grafting on a log scale, and a slight decrease in the degree of grafting results in an appreciable increase in the electrical resistance. Because the electrical resistance of the separator of this invention is determined by the ratio of the non-grafted areas to the areas of high degree of grafting, a drop in the average degree of grafting does not result in an excessive increase in the electrical resistance.

Such non-grafted areas and areas of high degree of grafting can be formed by a method which is properly selected depending upon the method of graft polymerization used. Suitable methods of graft copolymerization include (1) simultaneous irradiation wherein graft copolymerization is effected by exposing both a substrate film and a monomer to ionizing radiation; (2) preirradiation wherein a substrate film is exposed to ionizing radiation before it is brought into contact with a monomer; and (3) the chemical method wherein a substrate film is graft-copolymerized with a monomer in the presence of a polymerization initiator. Any of these methods can be used to produce the separator of this invention. In the pre-irradiation method, a polyethylene film is exposed to ionizing radiation through a shielding material, such as a metal screen, that is placed on the film. Since shielded areas are not exposed to ionizing radiation, they do not form starting points (primarily radicals) for graft copolymerization and there occurs no graft copolymerization in these areas upon contact with a monomer. Another technique is to provide, by means of printing or coating, the surface of the polyethylene film with a lattice pattern of a substance that prevents the grafting of a monomer onto polyethylene, for example, oily ink if the monomer solution is aqueous. By so doing, the portion of the film covered with the lattice pattern is not contacted by the monomer and non-grafted areas are formed. Non-grafted areas can also be formed in the simultaneous irradiation method and chamical method by the same procedure in appropriate consideration of the type of the monomer and solvent used.

The shape and size of the areas of high degree of grafting and non-grafted areas can be properly selected depending upon the type and size of a cell to be made. For a sealed small-size cell that uses a separator which is about 10 mm in diameter, a grafted membrane containing non-grafted areas in a lattice form having a shape and size equivalent to less than 100 mesh and areas of high degree of grafting that are surrounded by these non-grafted areas is suitable as a separator. A lattice pattern equivalent to 2 mesh may be formed on the grafted membrane if it is used in a relatively large-size cell such as an open Ni-Cd cell which uses a separator measuring 12×10 cm. The areas of high degree of grafting may be circular, hexagonal, rectangular and of any other shape, but it is essential that non-grafted areas are continuous and surround discrete grafted areas.

This invention is now described in greater detail by reference to the following examples, and it should be understood that the examples are given here for illustrative purposes only and are by no means intended to limit the scope of the invention.

EXAMPLE 1

Oil paint was applied to a low-density polyethylene film (25 μm thick) in a lattice pattern (each open space being 100 mesh) to provide discrete square non-printed areas and continuous printed areas. The polyethylene film was irradiated with electron beams to give a total dose of 30 Mrads (acceleration voltage: 2 MeV, acceleration current: 5 mA). The irradiated film was immersed in an aqueous monomer solution comprising 50 parts of acrylic acid, 50 parts of water and 0.25% of Mohr's salt at 25° C. for 5 hours. Nitrogen gas had been bubbled to reduce the content of the oxygen dissolved in the monomer solution to less than 0.1 ppm. The thus obtained grafted membrane was washed with water and immersed in a 2.5% aqueous KOH solution at 90° C. for 5 minutes to make a potassium salt of the grafted membrane. The resulting separator had an average degree of grafting of 65% and exhibited an electrical resistance of 85 mΩ·cm² as measured in a 40% aqueous KOH solution at 25° C. at 1000 Hz A.C. When a 100 m×100 mm strip of the separator was immersed in 40% KOH, it expanded by a degree of 0.5 m×0.3 mm.

As a control, a polyethylene film without a lattice pattern of oil paint coating was treated in the same manner as in Example 1 to prepare a grafted membrane. The membrane had a degree of grafting of 75%, an electrical resistance of 70 mΩ·cm², and expanded in 40% KOH by a degree of 15% in both longitudinal and transversal directions.

EXAMPLE 2

A high-density polyethylene film (25 μm thick) having a stainless steel net of 50 mesh on it was irradiated with electron beams to give a total dose of 20 Mrads under cooling with liquid nitrogen. The irradiated film was immersed in an aqueous monomer solution comprising 20 parts of methacrylic acid, 80 parts of water and 0.25% of Mohr's salt at 25° C. for 5 hours. The content of the oxygen dissolved in the monomeric solution had been reduced to less than 0.1 ppm. The thus obtained grafted membrane was washed with water, immersed in a 2.5% aqueous KOH solution at 95° C. for an hour, again washed with water and dried. The resulting separator had an average degree of grafting of 105% and an electrical resistance of 70 mΩ·cm². When a 100 m×100 mm strip of the separator was immersed in a 40% KOH electrolyte, it expanded to dimensions of 101 m×102 mm. The separator was impregnated with an electrolyte and placed between positive and negative plates to make an open Ni-Cd cell (nominal capacity: 20 A·h), and no gas occlusion was observed between the separator and each of the grids even upon overdischarging.

In Examples 1 and 2, this invention has been described in connection with the method of producing a dimensionally stable cell separator. This feature can be used to provide a cell which is easy to assemble and liquid-tight. Simply stated, a strip of polyethylene film is so graft-copolymerized that a non-grafted area (which forms an ion impermeable area in a cell) provides discrete areas of high degree of grafting (which form ion permeable areas in the cell), and the resulting grafted membrane is cut into a suitable length which is contacted by a positive or negative plate of a cell primarily in the ion permeable areas. According to one embodiment, cell elements such as active materials, electrolyte and a current collector are arranged on the ion permeable areas of a separator which is either directly or indirectly bonded to a protective material of ion impermeable polymer in the ion impermeable areas of the separator, and a current collector is attached to the resulting assembly. By this method, a small-size or thin cell which provides perfect protection against electrolyte leak can be manufactured at low cost.

Conventionally, small-size cells such as those of zinc-silver oxide system and nickel-cadmium system have a positive active material, separator and negative active material individually encased in a metal container. In such system, there is always a potential leak of the electrolyte because protecting metals contact each other or they contact the polymeric material of which the separator is made. In addition, the synthetic fiber or polymer film used in the separator is not evenly joined with the metal, and so, take the example of a silver oxide cell, silver ions migrate from the positive electrode to negative electrode through any gap between the fiber or film and the metal (this results in self-discharging of the cell) and a deposit of metallic silver grows toward the positive electrode and span the gap between the positive and negative electrodes to cause a shortcircuit.

Such defects of the conventional small-size cell is eliminated from this invention as will be understood from the following description. FIG. 2 is a cross section of a sheet of polymeric material 21 part of which is rendered hydrophilic. FIG. 3 shows a separator made of a polymeric material that has ion permeable areas 22 formed by providing part of the sheet of FIG. 2 with hydrophilic groups; FIG. 3(a) is a plan view of the separator, and FIG. 3(b) is a cross section taken on the line A—A'. FIG. 4 is a cross section of a cell according to one embodiment of this invention, wherein 23 is a positive electrode or positive active material, 24 is a negative electrode or negative active material, 25 is a current collector terminal or projection, 26 is a polymeric protective layer which is bonded to the ion impermeable areas of the separator sheet 21. FIG. 5 shows a current collector terminal which comprises a metal collector plate 27, a collector projection 25 protruding into either active material and a resin 28 for lining the collector metal plate. FIG. 6 is a cross section showing another embodiment of the cell of this invention, wherein a protective film of synthetic resin 26 is bonded to the ion impermeable areas of the separator by means of heat or an adhesive, a current collector projection 25 protruding into the positive or negative plate, and the resin lining on the collector plate is bonded to the protective film of synthetic resin by means of heat or an adhesive. FIG. 7 illustrates how the cell of this invention can be mass-produced; FIG. 7(a) is a plan view of a plurality of cells formed on a separator sheet, and FIG. 7(b) is a cross section taken on the line B—B'. FIG. 8(a) is a plan view of a positive or negative active material as it is bonded or printed onto a protective sheet during mass production, and FIG. 8(b) is a cross section taken on the line C—C'. According to the embodiment shown in FIG. 8, a layer of active material as thin as about 0.1 to 0.5 mm can be used, and the primary part of a cell can be produced by superimposing a separator sheet on a protective sheet provided with an active material and heat-bonding the two sheets only in the ion impermeable areas. A sheet having a plurality of current collector terminals is then superimposed on the protective sheet to have the current collector projections protrude into the active material, and the resulting assembly is cut into individual discreate cells. In this manner, a plurality of cells can be manufactured in a single operation. FIG. 9 shows a plurality of current collector terminals formed in a sheet form by letting metal projections exposed from selected areas of a nickel or copper plate laminated with a resin; FIG. 9(a) is a plan view and FIG. 9(b) is a cross section taken on the line D—D'.

The cell using the separator of this invention is described in greater detail by reference to the following examples which are again given here for illustrative purposes only and to which this invention is by no means limited.

EXAMPLE 3

Paint mainly comprising red lead oxide was applied to the entire surface of a polyethylene sheet (25 $\mu$m thick) with a circle 10 mm in diameter left unpainted. The sheet was irradiated with electron beams to give a total dose of 10 Mrads and immersed for 5 hours in a monomer aqueous solution containing 0.16% of Mohr's salt as well as a mixture of acrylic acid, water and ethylene dichloride (50:40:10 by volume). The solution had been bubbled with nitrogen gas to remove the dissolved oxygen. A partially ion permeable grafted membrane resulted; the membrane had a degree of grafting of 50% in the area through which the electron beams transmitted, and its electrical resistance was 100 m$\Omega\cdot$cm$^2$ as measured in 40% KOH. Acrylic acid was little grafted onto the area of the polyethylene sheet coated with red lead and so, that area retained the inherent nature of polyethylene and was ion impermeable. The area where grafting occurred swelled to form a pocket (or bulge). A layer of a composition 0.5 mm thick that contained silver oxide as a positive active material was put in the pocket and a layer of another composition 0.3 mm thick containing zinc as a negative active material was placed on the opposite side of the membrane. The assembly of the membrane, and positive and negative materials were wrapped with a polypropylene film 30 $\mu$m thick which was heat-bonded to the ion impermeable area of the separator to provide a liquid-tight enclosure. The projection of a current collector terminal was pricked into the protective film of synthetic resin and at the same time, the resin lining on the metal collector plate was bonded by heat fusion to the protecting film. The resulting cell was 20% thinner than the conventional type of cell, and it was completely protected against electrolyte leak, and the cost was reduced by 30%.

EXAMPLE 4

High-density polyethylene was extruded through a T-die to form a film 25 $\mu$m thick, and the film was irradiated with electron beams (acceleration voltage: 2 MeV, acceleration current: 5 mA) to give a total dose of 30 Mrads in a nitrogen atmosphere. The film was passed through heated rolls having a circular cavity 10 mm in diameter, and immediately immersed for 5 hours in a deoxidized, aqueous monomer solution identical with what was used in Example 3. The resulting film consisted of a grafted area and an area of very low degree of grafting which was formed due to the loss of active sites upon heating, and the grafted area swelled to form a pocket. A pressed layer of a composition 0.3 mm thick that contained a negative active material was put in the pocket and a pressed layer of another composition 0.2 mm thick that contained a positive active material was placed on the opposite side of the film. The assembly was bonded by heat fusion to a polypropylene film in the same manner of Example 3 to provide a liquid-tight enclosure. A collector terminal was bonded to the assembly in the same manner as Example 3. In this manner, a number of reliable cells free from electrolyte leak could be produced at low cost.

EXAMPLE 5

A high-density polyethylene film 25 $\mu$m thick was irradiated with electron beams to give a total dose of 20 Mrads and both sides of the film were coated with a solution of polyvinyl chloride by gravure printing to provide a plurality of circles (10 mm in dia.) left uncoated. After drying, the film was immersed in an aqueous acrylic acid solution identical to what was used in Example 3 to form a separator having ion permeable graft groups formed thereon. A layer of positive active material was printed in a thickness of 0.2 mm to a protective polypropylene sheet 50 $\mu$m thick in areas corresponding to the ion permeable areas of the separator. This sheet was superimposed on the separator so that the active material contacted each of the ion permeable areas. A layer containing zinc powder as a negative active material was applied in a thickness of 0.1 mm to a polypropylene sheet 25 $\mu$m thick, and superimposed on the separator on the side opposite to the positive active material side. The three sheets were fused together at the ion impermeable areas of the separator to provide a liquid-tight enclosure. A sheet having a plurality of current collector terminals formed thereon was bonded to both sides of the sheet assembly, while at the same time, the projections on the terminals were inserted into each of the active materials. Each collector terminal comprised a collector plate 20 $\mu$m thick carrying a projection 100 $\mu$m long, and was lined with a resin layer 20 μm thick. The thus prepared sheet was set on a jig and individual discrete cells were punched out of the sheet. Each cell was as thin as 0.45 mm and could be produced in a simple manner at a cost about a third of that required for the production of the conventional cell.

As will be understood from the foregoing description, almost no graft copolymer is formed in the ion impermeable areas of the separator in which areas it is bonded by fusion to a cell protective layer, and the separator can be easily bonded by fusion to the protective layer to thereby provide a more reliable protection against electrolyte leak than mechanical clamping employed in the conventional technique for preventing leaks. In the practice of this invention, polyolefin resins such as polyethylene and polypropylene are used with advantage as a polymeric material which is to be provided with a hydrophilic group because these resins permit desired graft copolymerization. Any handling problem can be eliminated by using a metallic current collector and an optionally reinforced protective material to provide the cell with mechanical strength comparable to the conventional cell protected by a metal case. Since exposure of a synthetic resin film to ionizing radiation and its graft copolymerization can be performed continuously, a separator having an ion impermeable area can be obtained as a continuous sheet. A cell can be produced from this sheet in a highly productive method wherein as shown in Examples 3 and 4, elements for positive and negative electrodes are continuously placed in the ion permeable areas of a moving continuous separator sheet. Alternatively, a cell may be produced by placing sequentially active materials and protective layer on a separator sheet having 100 to 10,000 ion permeable areas.

That part of the current collector which contacts the positive or negative active material may be made of a copper bar plated with nickel or a stainless steel bar plated with copper, whereas the inside of the current collector is preferably provided with an integral layer such as a lining. The lining is preferably made of a material that is easily bonded by fusion to the outer protective layer, for example, a material the same as that of the outer protective layer or a material that fuses at a temperature close to the melting point of the protective layer specifically, polyolefinic resins such as polyethylene and polypropylene are preferred. For higher productivity, it is effective to use a shaped protective sheet or film onto which pellets of active material have been bonded or printed.

As a further advantage, according to this invention, a plurality of cells can be produced in a single operation from a stack of different cell elements on the condition that the elements be registered accurately.

What is claimed is:

1. A cell separator made of a grafted membrane comprising a polyethylene film which is graft-copolymerized with a monomer having an ion exchange group, said grafted membrane having an area which is not grafted at all or an area of low degree of grafting.

2. A cell separator according to claim 1 wherein the surface of said grafted membrane has areas of high degree of grafting which are rendered discrete by a continuous layer of the area which is not grafted at all or area of low degree of grafting.

3. A cell using a cell separator of claim 1 which is made of a grafted membrane comprising a polyethylene film that is graft-copolymerized with a monomer having an ion exchange group and which partially comprises an area that is not grafted at all, with the remainder being an area of high degree of grafting, said separator being impregnated with an electrolyte and placed between positive and negative electrode-plates.

* * * * *